United States Patent
Ohkoshi et al.

(10) Patent No.: US 9,633,770 B2
(45) Date of Patent: Apr. 25, 2017

(54) METHOD FOR IMPROVING COERCIVE FORCE OF EPSILON-TYPE IRON OXIDE, AND EPSILON-TYPE IRON OXIDE

(71) Applicants: THE UNIVERSITY OF TOKYO, Tokyo (JP); DOWA ELECTRONICS MATERIALS CO., LTD., Tokyo (JP)

(72) Inventors: Shin-ichi Ohkoshi, Tokyo (JP); Shunsuke Sakurai, Tokyo (JP); Asuka Namai, Tokyo (JP); Sayaka Umeda, Tokyo (JP); Hiroshi Hachiya, Tokyo (JP); Kazuyuki Matsumoto, Tokyo (JP); Takashi Gotoh, Tokyo (JP)

(73) Assignees: THE UNIVERSITY OF TOKYO, Tokyo (JP); DOWA ELECTRONICS MATERIALS CO., LTD., Tokyo (JP)

(*) Notice: Subject to any disclaimer, the term of this patent is extended or adjusted under 35 U.S.C. 154(b) by 0 days.

(21) Appl. No.: 15/231,122

(22) Filed: Aug. 8, 2016

(65) Prior Publication Data
US 2016/0343484 A1 Nov. 24, 2016

Related U.S. Application Data

(62) Division of application No. 13/499,172, filed as application No. PCT/JP2010/067094 on Sep. 30, 2010, now Pat. No. 9,458,026.

(30) Foreign Application Priority Data

Sep. 30, 2009 (JP) .................................. 2009-228752

(51) Int. Cl.
*C01G 49/08* (2006.01)
*C04B 35/26* (2006.01)
(Continued)

(52) U.S. Cl.
CPC ......... *H01F 1/047* (2013.01); *C01G 49/0018* (2013.01); *C01G 49/06* (2013.01);
(Continued)

(58) Field of Classification Search
CPC .......... C01G 49/08; C04B 35/26; C04B 35/64
(Continued)

(56) References Cited

U.S. PATENT DOCUMENTS

2006/0182997 A1 8/2006 Yamamoto et al.
2007/0218319 A1 9/2007 Ohkoshi et al.
(Continued)

FOREIGN PATENT DOCUMENTS

JP 2007-269548 A 10/2007
JP 2007-281410 A 10/2007
(Continued)

OTHER PUBLICATIONS

Ohkoshi et al. Declaration under 37 CFR 1.132. U.S. Appl. No. 13/499,172, filed Feb. 19, 2015.*
(Continued)

*Primary Examiner* — Matthew E Hoban
(74) *Attorney, Agent, or Firm* — Oliff PLC (57) ABSTRACT

An epsilon-type iron oxide having an Fe-site that is substituted with a platinum group element, provided that Fe of a D-site of the epsilon-type iron oxide is not substituted with the platinum group element.

4 Claims, 5 Drawing Sheets

(51) Int. Cl.
| | |
|---|---|
| *C04B 35/64* | (2006.01) |
| *H01F 1/047* | (2006.01) |
| *C01G 49/06* | (2006.01) |
| *C04B 35/628* | (2006.01) |
| *H01F 1/10* | (2006.01) |
| *C01G 49/00* | (2006.01) |

(52) U.S. Cl.
CPC ........ *C04B 35/26* (2013.01); *C04B 35/62826* (2013.01); *H01F 1/10* (2013.01); *C01P 2002/50* (2013.01); *C01P 2002/52* (2013.01); *C01P 2006/42* (2013.01); *C04B 2235/3217* (2013.01); *C04B 2235/3286* (2013.01); *C04B 2235/3289* (2013.01); *C04B 2235/3418* (2013.01); *C04B 2235/761* (2013.01)

(58) Field of Classification Search
USPC .......................................... 252/62.56, 62.57
See application file for complete search history.

(56) References Cited

U.S. PATENT DOCUMENTS

| | | |
|---|---|---|
| 2008/0057352 A1 | 3/2008 | Ohkoshi et al. |
| 2010/0062283 A1 | 3/2010 | Ohkoshi |
| 2010/0238063 A1 | 9/2010 | Ohkoshi et al. |

FOREIGN PATENT DOCUMENTS

| | | |
|---|---|---|
| JP | 2008-019162 A | 1/2008 |
| JP | 2008-060293 A | 3/2008 |
| JP | 2008-063199 A | 3/2008 |
| JP | 2008-063201 A | 3/2008 |
| JP | 2008-100871 A | 5/2008 |
| JP | 2008-277726 A | 11/2008 |
| JP | 2009-206376 A | 9/2009 |

OTHER PUBLICATIONS

Jin et al., "Giant Coercive Field of Nanometer-Sized Iron Oxide," Advanced Materials, Jan. 5, 2004, p. 48-51, vol. 16, No. 1.
Jin et al., "Formation of spherical and rod-shaped e-Fe2O3 nanocrystals with a large coercive field," Journal of Materials Chemistry, 2005, p. 1067-1071, vol. 15.
Sakurai et al., "Reorientation Phenomenon in a Magnetic Phase of e-Fe2O3 Nanocrystal," Journal of the Physical Society of Japan, Jul. 2005, p. 1946-1949, vol. 74, No. 7.
Dec. 28, 2010 International Search Report issued in Patent Application No. PCT/JP2010/067094.
Sakurai et al., "Large coercive field in magnetic-field oriented ϵ-Fe2O3 nanorods," Chemical Physical Letters, 2008, p. 333-336, vol. 458.
Tecek, "ϵ-Fe2O3: An Advanced Nanomaterial Exhibiting Giant Coercive Field, Millimeter-Wave Ferromagnetic Resonance, and Magnetoelectric Coupling," Chem. Mater., vol. 22, pp. 6483-6505, 2010.

* cited by examiner

METHOD FOR IMPROVING COERCIVE FORCE OF EPSILON-TYPE IRON OXIDE, AND EPSILON-TYPE IRON OXIDE

CROSS-REFERENCE TO PRIOR APPLICATIONS

This is a divisional of application Ser. No. 13/499,712 filed Jun. 25, 2012, which is a National Stage Application of PCT/JP2010/067094 filed Sep. 30, 2010, and claims the benefit of Japanese Application No. 2009-228752 filed Sep. 30, 2009. The entire disclosures of the prior applications are hereby incorporated by reference herein in their entirety.

TECHNICAL FIELD

The present invention relates to a method for improving a coercive force of epsilon-type iron oxide, being a magnetic material, and the epsilon-type iron oxide.

DESCRIPTION OF RELATED ART

In a field of a magnetic material, there is always a pursuit of a substance having a higher coercive force, responding to a request for a higher density of a magnetic recording for example. In such a pursuit, from a viewpoint of a substance having a high coercive force, an iron-platinum magnetic material is proposed, which is mainly composed of a noble metal and particularly a platinum group element as a main essential content.

However, it is disadvantageous to use a material containing a large quantity of platinum group as the main essential content, like the iron-platinum magnetic material. Further, when there is a necessity for using a large quantity of the material mainly composed of the platinum group element as the main essential content, there is a problem that supply instability occurs.

In order to solve the aforementioned disadvantage and risk, it is requested to use the magnetic material having high magnetic characteristic while using a small quantity of the platinum group element, even if using the platinum group element.

In order to respond to such a request, inventors of the present invention achieve the magnetic material such as epsilon-type iron oxide ($\epsilon$-$Fe_2O_3$). It is verified by the inventors of the present invention, that the epsilon-type iron oxide can be the magnetic material having high coercive force of 20 kOe while being an extremely inexpensive material such as iron oxide, and disclose such a rare magnetic characteristic in non-patent documents 1 to 3, and disclose a content that the magnetic characteristic can be adjusted by substituting Fe in the epsilon-type iron oxide, with other element in patent documents 1 to 3.

PRIOR ART DOCUMENT

Patent Documents

Patent document 1:
Japanese Patent Laid Open Publication No. 2007-269548
Patent document 2:
Japanese Patent Laid Open Publication No. 2007-281410
Patent document 3:
Japanese Patent Laid Open Publication No. 2008-060293

Non-Patent Documents

Non-patent document 1: Jian Jin, Shinichi Ohkoshi and Kazuhito Hashimoto ADVANCED MATERIALS Vol. 16 No. 1 (2004) pp. 48-51
Non-patent document 2: Jian Jin, Kazuhito Hashimoto and Shinichi Ohkoshi JOURNAL OF MATERIALS CHIMISTRY 15 (2005) pp. 1067-1071
Non-patent document 3: Shunsuke Sakurai, Jian Jin, Kazuhito Hashimoto and Shinichi Ohkoshi JOURNAL OF THE PHYSICAL SOCIETY OF JAPAN Vol. 74, No. 7 (2005) pp. 1946-1949

SUMMARY OF THE INVENTION

Problem to be Solved by the Invention

As is disclosed by the inventors of the present invention in patent document 1, etc., generally the magnetic characteristic can be controlled by substituting apart of Fe of the epsilon-type iron oxide with an element such as gallium, indium, and aluminum, and reducing the coercive force of the epsilon-type iron oxide. Namely, the magnetic material of the epsilon-type iron oxide having a highest coercive force, is a pure epsilon-type iron oxide with Fe not substituted with other kind of element.

Here, it can be considered that an application range of the epsilon-type iron oxide can be widened, if a control range of a coercive force value of the epsilon-type iron oxide can be expanded in a direction of improving the coercive force. In fact, when the coercive force value of the magnetic material constituting a radio wave absorption material is different in a radio wave absorption performance of the radio wave absorption material, it is confirmed that a radio wave absorption band of the radio wave absorption material is changed. However, conventionally it is known that the coercive force becomes smaller by carrying out substitution. Namely, it is industrially advantageous to provide a technique of improving the coercive force value of the epsilon-type iron oxide, from a viewpoint that the radio wave absorption band can be easily adjusted. However, the technique of improving the coercive force of epsilon-type iron oxide particles is not found.

In view of the above-described circumstance, the present invention is provided, and a technical problem to be solved is to provide a method for improving a coercive force of epsilon-type iron oxide particles and the epsilon-type iron oxide.

Means for Solving the Problem

As a result of strenuous efforts by the inventors of the present invention, and in order to solve the above-described problem, the following structures can be achieved.

Namely, according to a first structure to solve the above-described problem, there is provided a method for improving a coercive force of epsilon-type iron oxide, comprising: substituting a Fe-site of the epsilon-type iron oxide with other element, while not substituting Fe of D-site in the epsilon-type iron oxide with the other element.

According to a second structure, there is provided the method for improving the coercive force of epsilon-type iron oxide according to the first structure, wherein Fe of A-site in the epsilon-type iron oxide is not substituted with the other element.

According to a third structure, there is provided the method for improving the coercive force of the epsilon-type iron oxide according to the first or the second structure, wherein the other element is a platinum group element.

According to a fourth structure, there is provided the method for improving the coercive force of the epsilon-type iron oxide according to any one of the first to third structures, wherein the other element is rhodium.

According to a fifth structure, there is provided epsilon-type iron oxide, wherein Fe-site of the epsilon-type iron oxide is substituted with other element, and Fe of D-site in the epsilon-type iron oxide is not substituted with the other element.

According to a sixth structure, there is provided the epsilon-type iron oxide according to the fifth structure, wherein Fe in A-site in the epsilon-type iron oxide is not substituted with the other element.

According to a seventh structure, there is provided the epsilon-type iron oxide according to fifth or sixth structure, wherein the other element is a platinum group element.

According to an eighth structure, there is provided the epsilon-type iron oxide according to any one of the fifth to seventh structures, wherein the other element is rhodium.

Advantage of the Invention

According to a method for improving a coercive force of epsilon-type iron oxide of the present invention, the coercive force of the epsilon-type iron oxide can be improved to more than the coercive force of pure epsilon-type iron oxide in which Fe is not substituted with other kind of element.

DETAILED DESCRIPTION OF THE INVENTION

As described above, when Fe-site of the epsilon-type iron oxide powder having a crystal structure of ($\epsilon$-Fe$_2$O$_3$/Pna2$_1$) is substituted with other element, the coercive force of the powder is reduced. Under this state, various studies are carried out by inventors of the present invention to improve the coercive force of the epsilon-type iron oxide magnetic powder.

As a result, a breakthrough structure is found that the Fe-site of the epsilon-type iron oxide having the crystal structure of ($\epsilon$-Fe$_2$O$_3$/Pna2$_1$) is substituted with other element, while not substituting Fe of D-site in this epsilon-type iron oxide with other element. It is also found that the coercive force is further improved in a case of adding a structure that Fe of A-site in the epsilon-type iron oxide is not substituted with other element. Further, it is also found that the platinum group element is used as the other element, as a means for realizing this structure.

Structure of Particles

Figure 1:
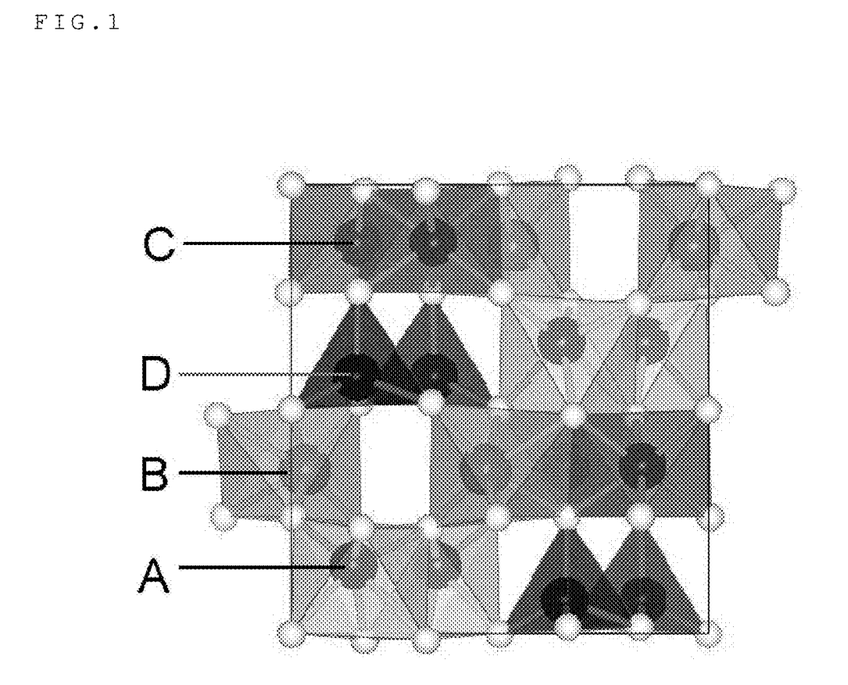
FIG. 1 is a schematic view showing a crystal structure of epsilon-type iron oxide according to the present invention.
Figure 2:
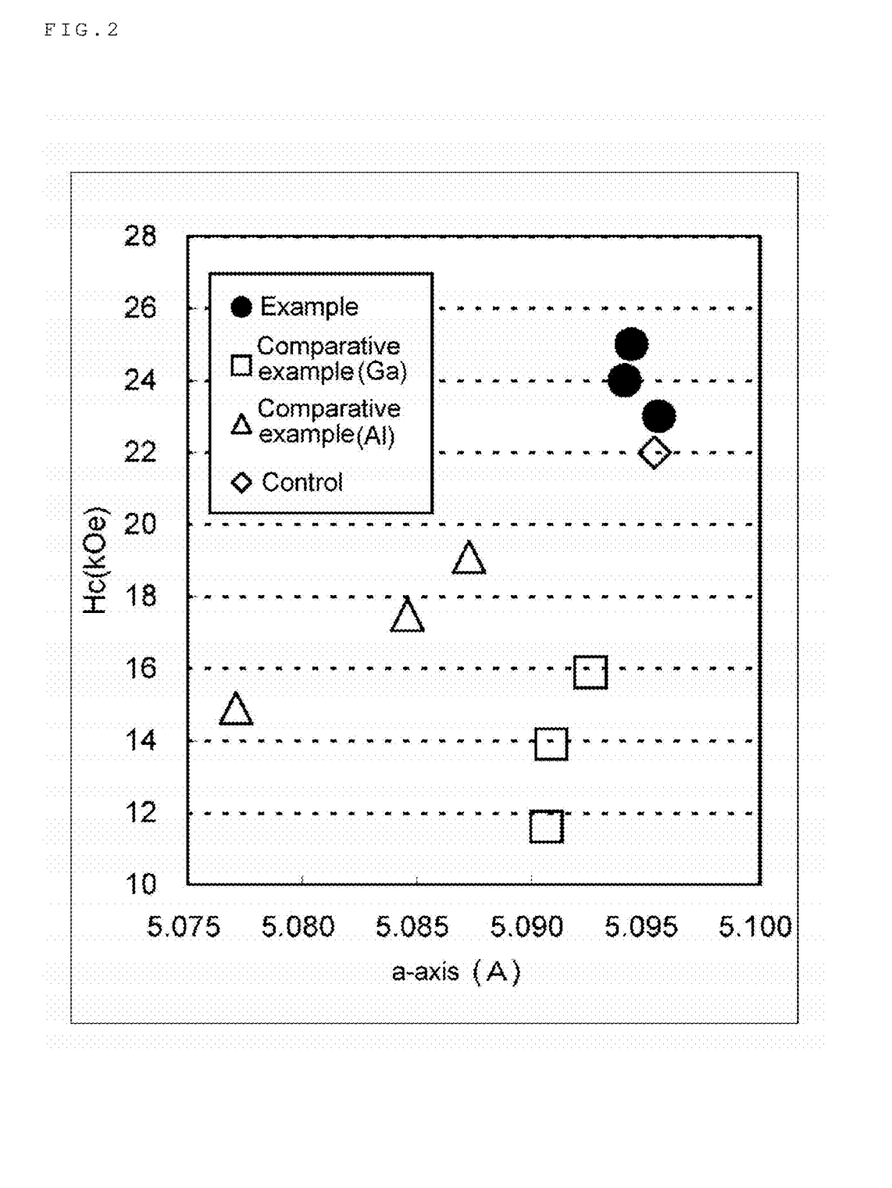
FIG. 2 is a view showing a correlation between a lattice length of a-axis of the epsilon-type iron oxide and a coercive force according to the present invention. (wherein, sample powders of examples 1 to 3 are shown by ●, pure epsilon-type iron oxide sample powders of control 1 are shown by ◇, gallium substituted sample powders of comparative examples 1 to 3 are shown by □, and aluminum substituted sample powders of comparative examples 4 to 6 are shown by △.)
Figure 3:
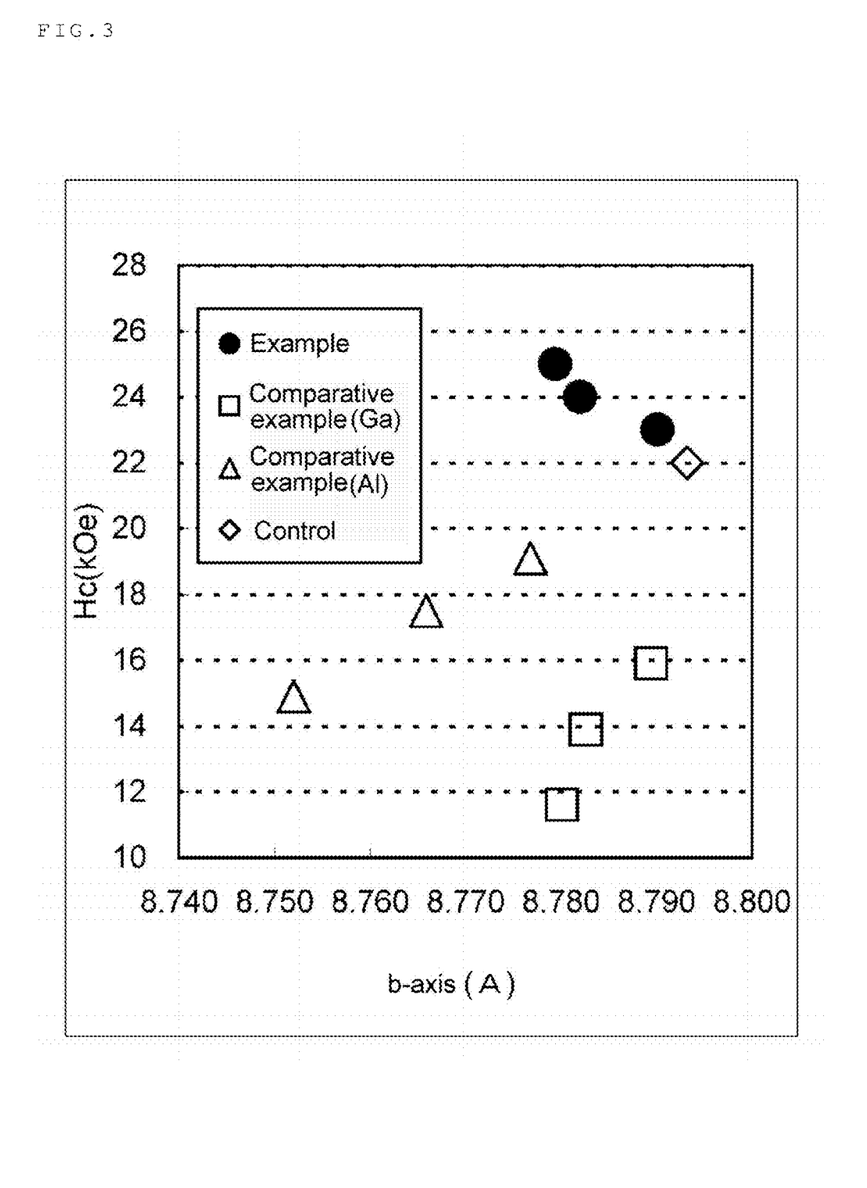
FIG. 3 is a view showing a correlation between the lattice length of b-axis of the epsilon-type iron oxide and the coercive force according to the present invention (the same symbols are shown as the symbols described in FIG. 1).
Figure 4:
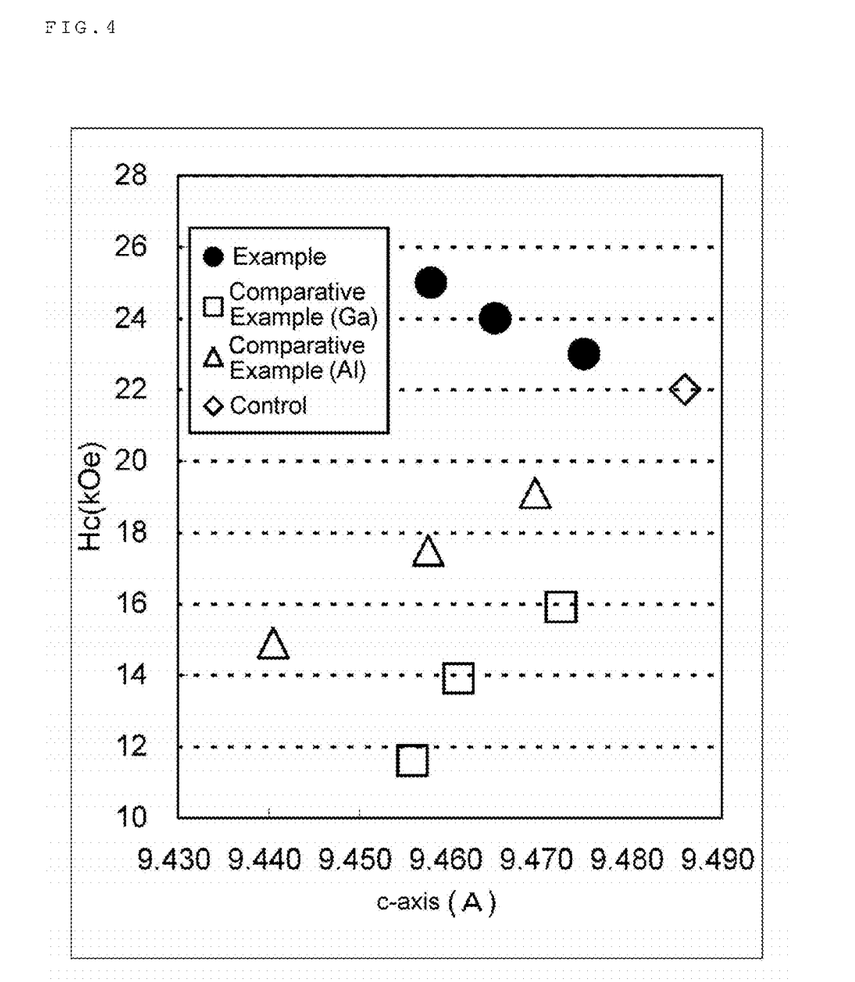
FIG. 4 is a view showing a correlation between the lattice length of c-axis of the epsilon-type iron oxide and the coercive force according to the present invention (the same symbols are shown as the symbols described in FIG. 1).
Figure 5:
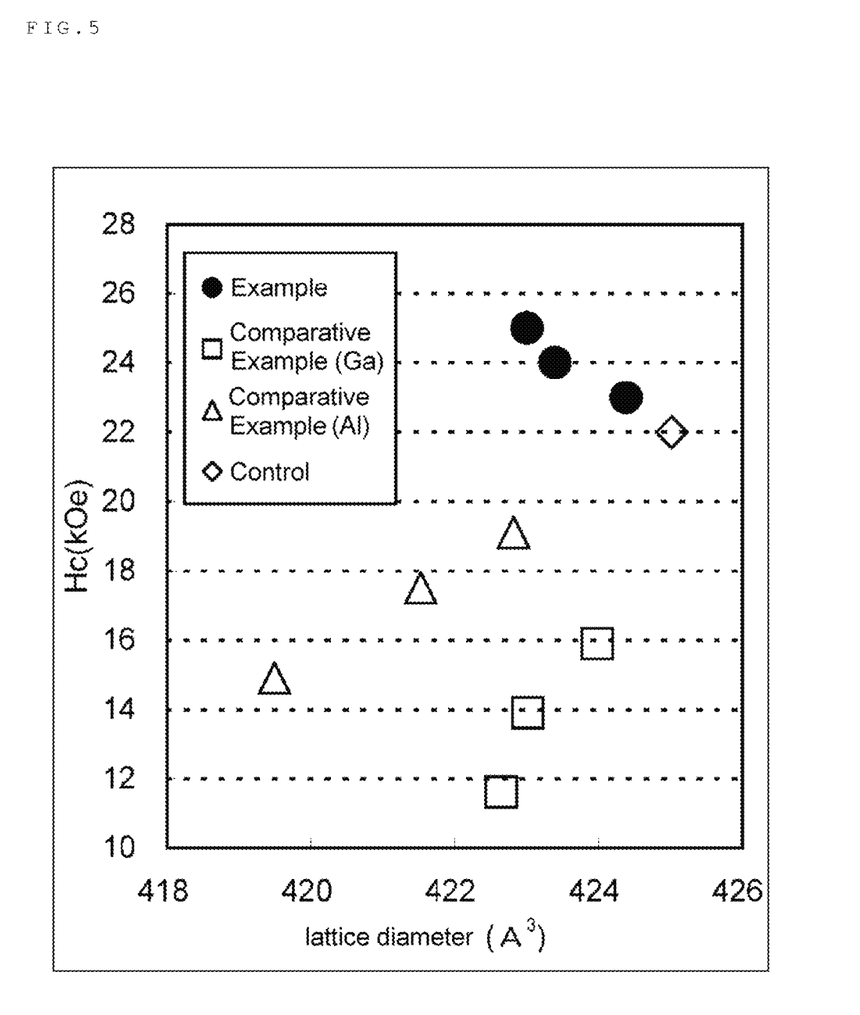
FIG. 5 is a view showing a correlation between a lattice volume of the epsilon-type iron oxide and the coercive force according to the present invention (the same symbols are shown as the symbols described in FIG. 1).

FIG. 1 is a schematic view of a crystal structure of the epsilon-type iron oxide ($\epsilon$-Fe$_2$O$_3$/Pna2$_1$) according to the present invention. In FIG. 1, large black circles show the Fe-site, and small white circles show 0-site. In the schematic view of this crystal structure, the Fe-site of A to D sites is shown using symbols of A to D respectively.

Here, whether Fe-atom exists in Fe-site of the A to D sites, or Fe is substituted with other element, is analyzed by Rietveld method.

In the epsilon-type iron oxide of the present invention, although a part of the Fe-site is substituted with other element, the substituted site is B-site and C-site. Namely, in this epsilon-type iron oxide, Fe of D-site is not substituted with other element. Further preferably, in this epsilon-type iron oxide, Fe of A-site is not substituted with other element.

Meanwhile, according to a conventional art, it is also found that when a part of the Fe-site is substituted with other element (trivalent metal element), mainly Fe of D-site is substituted. Namely, it can be considered that substitution with the trivalent element for reducing the coercive force of the epsilon-type iron oxide, is generated by substituting mainly Fe of D-site with other element.

Here, it is also found by the inventors of the present invention, that a platinum group element is suitable as an element allowing Fe-site of the epsilon-type iron oxide to be substituted and not allowing Fe of D-site in the epsilon-type iron oxide to be substituted. Further, it is also found that rhodium is further preferable among platinum group elements.

Then, in order to realize the aforementioned structure, it is sufficient to add very small quantity (2 mol % or less) of platinum group element to the epsilon-type iron oxide, thus providing a preferable structure from a viewpoint of a raw material cost.

EXAMPLES

The present invention will be specifically described hereafter, with reference to the drawings. However, the present invention is not limited to a range of these examples.

Example 1

25.5 g of trimethyl ammonium bromide, 715 mL of pure water, 105 mL of ethanol, 41 mL of 2,2',2"-nitro triethanol, were charged into a flask by Teflon (registered trademark), which were then stirred at 60° C. After dissolution of them, 71 mL of tetraethyl ortho silane was further added thereto, and a mixture was stirred for 2 hours at 60° C. in the atmosphere. After stirring, a generated precipitate was separated and collected. The collected precipitate was washed with ethanol, and was further sintered for 1 hour at 600° C. in the atmosphere, to thereby obtain mesoporous silica.

1.25 mmol of iron nitrate (III) and 0.02 mmol of rhodium nitrate are dissolved in 2.41 mL of a mixed solution of 80 mass % of methanol and water in a remaining part. The mixed solution thus prepared was impregnated in 0.70 g of mesoporous silica to thereby obtain an impregnated material. The obtained impregnated material was dried to obtain a dried material, which was then sintered for 4 hours at 1200° C., to thereby obtain a mesoporous silica coated material of rhodium-substituted epsilon iron oxide.

The obtained mesoporous silica coated material of rhodium-substituted epsilon iron oxide, was added to NaOH aqueous solution with a concentration of 2 mol/L, which was then stirred for 24 hours at 70° C. and from which silica was removed. After removing the silica, the material was further filtered, washed with water, and dried, to thereby obtain a sample powder of example 1.

The obtained sample powder of example 1 was subjected to powder X-ray diffraction (XRD: RINT2000 by Rigaku Corp, radiation source:CuKα, voltage:40 kV, current:30 mA). Then, according to a fine analysis of a crystal lattice, it was found that a diffraction pattern had a peak corresponding to the crystal structure (orthorhombic crystal, space group:Pna2$_1$) of the epsilon-type iron oxide. As described above, it was found that the crystal structure of the epsilon-type iron oxide was a main phase in the sample powder of example 1. A lattice constant of this crystal was as follows: a-axis=5.0956 Å, b-axis=8.7901 Å, c-axis=9.4748 Å, and lattice volume=424.39 Å$^3$.

Further, in the sample powder of example 1, a weak peak was also observed, corresponding to the crystal structure of α-Fe$_2$O$_3$ (hexagonal crystal, space group R-3c). However, the peak of the other magnetic crystal was not recognized.

Regarding the sample powder of example 1, a substitution state of Fe in A to D sites of the epsilon-type iron oxide was measured by Rietveld method. Then, rhodium, being a substation element, was not recognized in A-site and D-site. Meanwhile, 1% of rhodium was recognized in B-site, and 6% of rhodium was recognized in C-site respectively.

Regarding the sample powder of example 1, a magnetic hysteresis loop was measured under applied magnetic field of 90 kOe, using PPMS (Physical Property Measurement System) by Quantum Design Inc. As a result, it was found that coercive force Hc was 23.0 kOe (1830.3 kA/m), and σs was 17.9 Am$^2$/kg. This value was beyond 21.8 kOe (1734.8 kA/m), being the coercive force (Hc) of pure epsilon-type iron oxide, which was a control when Fe was not substituted with other kind of element.

The aforementioned analysis results and magnetic characteristic measurement results are shown in table 1.

Examples 2 and 3

An operation similar to the operation of example 1 was performed, excluding a point that addition amount of the rhodium nitrate was set to 0.05 mmol in example 2 and 0.08 mmol in example 3, to thereby obtain sample powders of examples 2 and 3.

Analysis and magnetic characteristic measurement similar to those of example 1 were performed to the obtained sample powders of examples 2 and 3. Analysis results and magnetic characteristic measurement results thereof are shown in table 1.

As is clarified from table 1, when Fe of the epsilon-type iron oxide was substituted with rhodium, Fe of A-site and D-site was not substituted, and Fe of B-site and C-site was substituted.

When magnetic characteristic was observed, it was found that both sample powders of examples 2, 3 had the coercive force exceeding the coercive force (Hc) of pure epsilon-type iron oxide, which was a control when Fe was not substituted with other kind of element.

Control 1

An operation similar to the operation of example 1 was performed, excluding a point that rhodium nitrate was not added, to thereby obtain sample powder of control 1, being pure epsilon-type iron oxide with Fe not substituted with other kind of element.

Analysis and magnetic characteristic measurement similar to those of example 1 were performed to the obtained sample powder of control 1. Analysis results and magnetic characteristic measurement results thereof were shown in table 1.

Comparative Examples 1 to 3

A method for manufacturing gallium-substituted epsilon-type iron oxide according to comparative examples 1 to 3 will be simply described (see Japanese Patent Laid Open Publication No. 2007-269548 for details)

First, iron nitrate (III) 9 hydrate, gallium nitrate (III) n hydrate, and barium nitrate, were added to a mixed solution of pure water, n-octane, 1-butanol, which was then stirred and dissolved. Further, cetyltrimethyl ammonium bromide was added as a surfactant, which was then stirred and dissolved, to thereby obtain micellar solution I.

Next, n-octane and 1-butanol were added to a mixed solution of 25% ammonium water and pure water, which was then stirred well. Cetyltrimethyl ammonium bromide was added and dissolved into this mixed solution as a surfactant, to thereby obtain micellar solution II.

Then, micellar solution II was dropped and mixed into the micellar solution I, and thereafter tetraethoxysilane was added thereto, and a mixed solution was continued to be stirred, and was subjected to an action of a centrifugal machine, to thereby recover a precipitate.

The recovered precipitate was washed using a mixed solution of chloroform and methanol, which was then dried, and subjected to heat treatment for 4 hours at 1000° C. in the atmosphere, to thereby obtain heat-treated powder.

The heat-treated powder was stirred in NaOH aqueous solution from which silica was removed, which was then filtered, washed with water, and dried, to thereby obtain gallium-substituted epsilon-type iron oxide powder of comparative examples 1 to 3.

At this time, gallium nitrate (III)n hydrate was added to obtain a ratio shown in table 1.

Analysis and magnetic characteristic measurement similar to those of example 1 were performed to the obtained sample powder of comparative examples 1 to 3. Analysis results and magnetic characteristic measurement results thereof are shown in table 1.

As is clarified from table 1, when Fe of the epsilon-type iron oxide was substituted with gallium, it was found that Fe of A-site and B-site was not substituted and Fe of C-site and D-site was substituted.

When the magnetic characteristic was observed, in all sample powders of comparative examples 1 to 3, the coercive force was below the coercive force (Hc) of pure epsilon-type iron oxide, which was a control when Fe was not substituted with other kind of element.

Comparative Examples 4 to 6

Explanation will be given for a method for manufacturing aluminum-substituted epsilon-type iron oxide of comparative examples 4 to 6. (see Japanese Patent Laid Open Publication No. 2008-060293 for details)

First, iron nitrate (III) 9 hydrate and aluminum nitrate (III) 9 hydrate, were added to a mixed solution of pure water, n-octane, 1-butanol, which was then stirred and dissolved. Further, cetyltrimethyl ammonium bromide was added as a surfactant, which was then stirred and dissolved, to thereby obtain micellar solution I.

Next, n-octane and 1-butanol were added to a mixed solution of 25% ammonium water and pure water, which was then stirred well. Cetyltrimethyl ammonium bromide was added and dissolved into this mixed solution as a surfactant, to thereby obtain micellar solution II.

Then, micellar solution II was dropped and mixed into the micellar solution I, and thereafter tetraethoxysilane was added thereto, and a mixed solution was continued to be stirred, and was subjected to an action of a centrifugal machine, to thereby recover a precipitate.

The recovered precipitate was washed using a mixed solution of chloroform and methanol, which was then dried, and subjected to heat treatment for 4 hours at 1150° C. in the atmosphere, to thereby obtain heat-treated powder.

The heat-treated powder was stirred in NaOH aqueous solution from which silica was removed, which was then filtered, washed with water, and dried, to thereby obtain aluminum-substituted epsilon-type iron oxide powder of comparative examples 4 to 6.

At this time, aluminum nitrate (III)9 hydrate was added to obtain a ratio shown in table 1.

Analysis and magnetic characteristic measurement similar to those of example 1 were performed to the obtained sample powder of comparative examples 4 to 6. Analysis results and magnetic characteristic measurement results thereof are shown in table 1.

As is clarified from table 1, when Fe of the epsilon-type iron oxide was substituted with aluminum, Fe of A-site to D-site was substituted.

When magnetic characteristic was observed, it was found that all sample powders of comparative examples 4 to 6 had the coercive force below the coercive force (Hc) of pure epsilon-type iron oxide, which was a control when Fe was not substituted with other kind of element.

TABLE 1

| | Substitution ratio from Fe to each substitution element | | | Charging amount | | | | Substitution ratio of each site | | | |
|---|---|---|---|---|---|---|---|---|---|---|---|
| | Rh | Ga | Al | Fe (mol/dm$^3$) | Rh (mol/dm$^3$) | Ga (mol/dm$^3$) | Al (mol/dm$^3$) | A (%) | B (%) | C (%) | D (%) |
| Example 1 | 0.03 | | | 0.52 | 0.008 | | | 0 | 1 | 6 | 0 |
| Example 2 | 0.07 | | | 0.52 | 0.021 | | | 0 | 1 | 13 | 0 |
| Example 3 | 0.10 | | | 0.52 | 0.033 | | | 0 | 1 | 20 | 0 |
| Control 1 | 0.00 | 0.00 | 0.00 | | | | | 0 | 0 | 0 | 0 |
| Comparative example 1 | | 0.10 | | 0.48 | | 0.025 | | 0 | 0 | 8 | 12 |
| Comparative example 2 | | 0.15 | | 0.46 | | 0.038 | | 0 | 0 | 9 | 21 |
| Comparative example 3 | | 0.22 | | 0.44 | | 0.058 | | 0 | 0 | 9 | 35 |
| Comparative example 4 | | | 0.06 | 0.49 | | | 0.013 | 3 | 0 | −2 | 11 |
| Comparative example 5 | | | 0.09 | 0.48 | | | 0.025 | 3 | −1 | −1 | 17 |
| Comparative example 6 | | | 0.21 | 0.45 | | | 0.050 | 0 | 3 | 8 | 30 |

| | Crystal lattice | | | | Magnetic characteristic (300 K) | | | |
|---|---|---|---|---|---|---|---|---|
| | a-axis (Å) | b-axis (Å) | c-axis (Å) | lattice volume (Å$^3$) | Hc (kOe) | Hc (kA/m) | σs (Am$^2$/kg) | Tc (°C.) |
| Example 1 | 5.0956 | 8.7901 | 9.4748 | 424.39 | 23.0 | 1830.3 | 17.9 | 493 |
| Example 2 | 5.0941 | 8.7820 | 9.4650 | 423.40 | 23.9 | 1901.9 | 14.9 | 484 |
| Example 3 | 5.0944 | 8.7794 | 9.4579 | 423.01 | 24.8 | 1973.5 | 12.4 | 474 |
| Control 1 | 5.0954 | 8.7932 | 9.4859 | 425.02 | 21.8 | 1734.8 | 19.2 | 500 |
| Comparative example 1 | 5.0926 | 8.7894 | 9.4723 | 423.99 | 15.9 | 1265.3 | 14.9 | 492 |
| Comparative example 2 | 5.0909 | 8.7826 | 9.4610 | 423.02 | 13.9 | 1106.1 | 16.4 | 480 |
| Comparative example 3 | 5.0907 | 8.7801 | 9.4559 | 422.65 | 11.6 | 923.1 | 24.7 | 470 |
| Comparative example 4 | 5.0873 | 8.7768 | 9.4694 | 422.82 | 19.1 | 1519.9 | 15.1 | 496 |
| Comparative example 5 | 5.0846 | 8.7659 | 9.4576 | 421.53 | 17.5 | 1392.6 | 14.6 | 490 |
| Comparative example 6 | 5.0771 | 8.7520 | 9.4405 | 419.49 | 14.9 | 1185.7 | 17.0 | 480 |

Note that in a column of "substitution ratio of each site" in table 1, a negative value shows a value of substantially 0.

When Fe-site of the epsilon-type iron oxide was substituted with elements such as gallium and aluminum, it was found that a crystal lattice diameter of a-axis to c-axis tended to be shorter, and a lattice volume was contracted, and reduction of the coercive force was observed, with an increase of a substitution amount of the element in a case of a conventional substituted particle.

Meanwhile, in the sample of the present invention as well, when Fe-site was substituted with rhodium, as shown in FIG. 2 to FIG. 5, decrease of the crystal lattice diameter of b-axis and c-axis and contraction of the crystal volume were observed. However, when Fe-site was substituted with rhodium, it was found that unconventional physical characteristic was exhibited, such as increase of the coercive force, irrespective of generation of the contraction of the crystal lattice.

After strenuous efforts by the inventors of the present invention to clarify a reason for allowing the above-described matter to occur, it was found that the substituted Fe-site was shifted toward B-site and C-site. By such a shift, it was confirmed that substitution was not generated in D-site and A-site, in the sample particle of examples 1 to 3.

From these characteristics, it can be considered that improvement of the coercive force in the epsilon-type iron oxide can be observed by rhodium substitution of Fe-site.

INDUSTRIAL APPLICABILITY

A magnetic material of the present invention is useful for the purpose of use for a high density magnetic recording medium. Further, the magnetic material of the present invention can be used for radio wave absorption materials, nanoscale electronics materials, permanent magnet materials, biomolecule labeling agents, and drug carriers, from stability as a material because the magnetic material of the present invention is oxide, and from excellent magnetic characteristic.

The invention claimed is:

1. An epsilon-type iron oxide, comprising an Fe-site that is substituted with a platinum group element, provided that Fe of a D-site of the epsilon-type iron oxide is not substituted with the platinum group element.

2. The epsilon-type iron oxide according to claim 1, wherein Fe of an A-site of the epsilon-type iron oxide is not substituted with the platinum group element.

3. The epsilon-type iron oxide according to claim 1, wherein the platinum group element is rhodium.

4. The epsilon-type iron oxide according to claim 2, wherein the platinum group element is rhodium.

* * * * *